Figure 1:
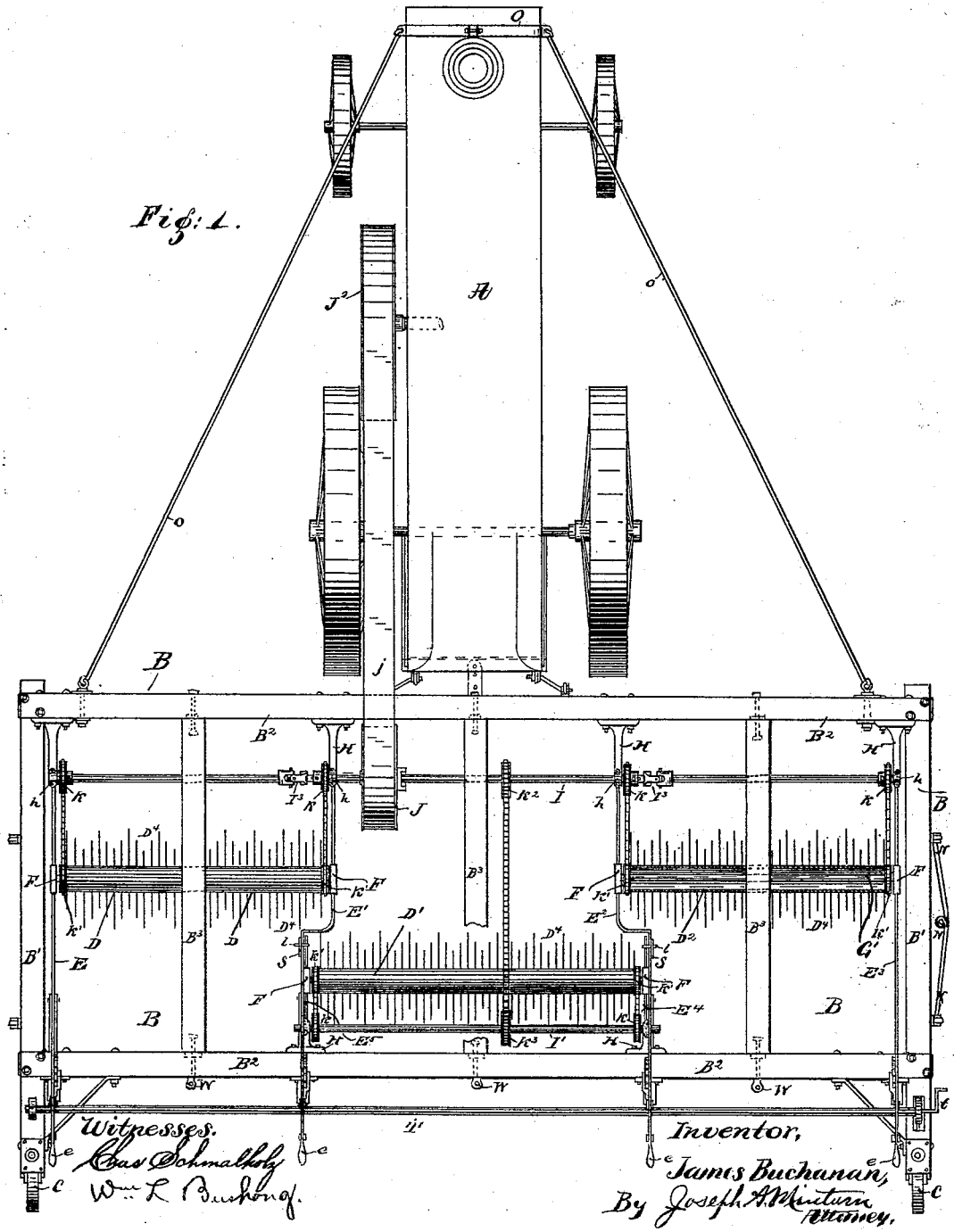

(No Model.) 2 Sheets—Sheet 1.

J. BUCHANAN.
GROUND PULVERIZER.

No. 495,105. Patented Apr. 11, 1893.

Fig: 1.

(No Model.) 2 Sheets—Sheet 2.

J. BUCHANAN.
GROUND PULVERIZER.

No. 495,105. Patented Apr. 11, 1893.

Witnesses:
Chas Schmalholz
Wm R. Burlong

Inventor,
James Buchanan,
By Joseph A. Minturn
Attorney.

UNITED STATES PATENT OFFICE.

JAMES BUCHANAN, OF INDIANAPOLIS, INDIANA.

GROUND-PULVERIZER.

SPECIFICATION forming part of Letters Patent No. 495,105, dated April 11, 1893.

Application filed February 5, 1892. Serial No. 420,451. (No model.)

*To all whom it may concern:*

Be it known that I, JAMES BUCHANAN, a citizen of the United States, residing at Indianapolis, in the county of Marion and State of Indiana, have invented certain new and useful Improvements in Ground-Pulverizers; and I do hereby declare the following to be a full, clear, and exact description of the invention, such as will enable others skilled in the art to which it appertains to make and use the same.

This invention relates to improvements in machinery for breaking, preparing and pulverizing the soil for seeding purposes, and has for its objects: First—The loosening and pulverizing of the ground from one inch to twelve inches in depth as may be desired, without materially changing the position of the several layers of the soil, as is done by the mold board plows now in general use, which, in a slow and laborious manner, turn the surface soil underneath. Second—To provide a machine that will at a single passage over the ground perfectly prepare the same for the reception of the seed, or grain to be planted, and at the same time if desired, with the same power, carry or draw with it seeders, grain-drills or planters that will plant the seed, or grain at the same instant the soil is prepared for its reception; thus avoiding the numerous successive expensive and laborious operations that are now necessary, to wit: 1—Passing over the ground to be planted with rakes, or other similar devices to remove the grass, weeds, stalks or other vegetable débris. 2. Passing over it again with a plow turning the surface soil over leaving it in a rough cloddy condition; 3. Passing over it again with a harrow or drag, to break to pieces a portion of the clods and partially evening up the surface; 4. Passing over it again, with rollers to pulverize the clods and smooth the surface; 5. Passing over it again with seeders, drills or planters—planting the seed or grain for producing the crop. Third—To provide a machine that will cut into small pieces all grass, weeds, stalks, or other vegetable débris that may be upon the ground, and leave it mixed with the soil so as to decay and enrich the same. Fourth—To provide a machine that will operate on a large area of surface at a single passage over the ground, adjust itself to the inequalities of the surface, produce a uniform effect upon the area covered, leaving the surface smooth, have it under the control of the operator so that he may quickly and without stopping the machine, regulate the depth of pulverization, economize power, time, labor, and expense in the preparation of the soil and planting of the crops. Fifth—To provide a machine, simple, cheap and durable in its construction, with few parts liable to get out of order, all parts readily accessible and easily repaired. I accomplish these objects by the mechanism illustrated in the accompanying drawings, in which—

Figure 2:
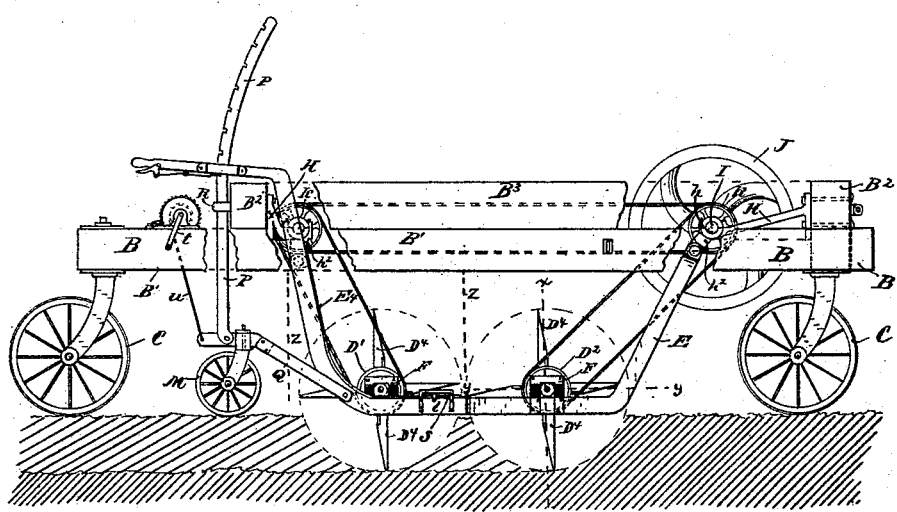
Figures 3, 4, 5, 6, 7:
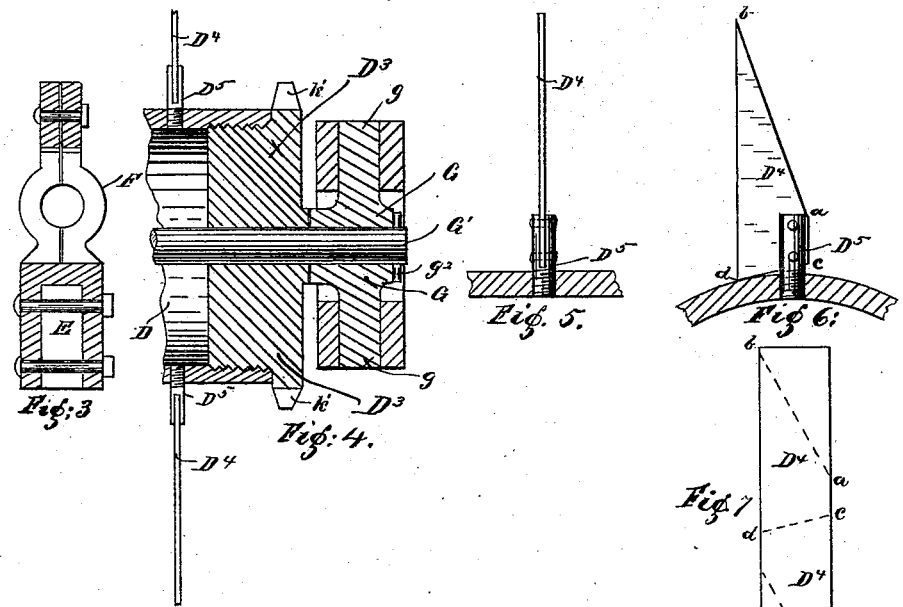

Figure 1, is a top or plan view of a machine constructed in accordance with my invention. The motive power is supplied by a steam traction engine, of any well known construction. In this view the engine is shown attached in position for moving the machine when at work, also it shows the rotary motion transmitted from the engine pulley to pulley on counter shaft of the machine by a belt, and from such counter shaft to the cutting cylinders by chain belts; double gearing the same. This rotary motion may be transmitted by cog gears and tumbling shafts when preferred. The cutting cylinders in this view are shown in a gang of three. One of the cylinders is sectioned to better illustrate the construction and the knives are omitted from the upper parts of the remaining cylinders, to avoid confusing the drawings. Fig. 2, is a view in side elevation of my improved machine, and is here shown as detached from the engine. Fig. 3, is a detail in vertical cross section of the frame. F, that holds circular journal boxes G, and is mounted upon and secured to levers E, E', $E^2$, $E^3$, $E^4$, $E^5$, on the line $x\ x$, through Fig. 2. Fig. 4, is a detail in horizontal section of cylinder on line $y\ y$, through Fig. 2, and also shows circular journal boxes with trunnions, also of frame F. Fig. 5, is a detail showing the manner in which the knives are fastened to the tap-bolts that are screwed into the cylinders. Fig. 6, is a side view of knife showing the shape of each of same, and position when in place on the cylinder. Fig. 7, is a blank from which the knives are cut, showing the required shapes, and manner of cutting them, to economize material.

Similar letters refer to like parts throughout the several views.

In Fig. 1, A, represents a traction engine of any well known construction, which furnishes the motive power by which the entire machine is moved forward over the ground to be pulverized; also at the same time power is transmitted from the engine pulley by means of belts, or from the pulley shaft by cog gears and tumbling shafts, rapidly rotating the cutting cylinders in the direction the engine is traveling. The rotation of the cylinders can thus be fixed at any desired speed without reference to the travel of the engine, as the cylinders are not dependent on such travel for their rotary motion.

B. is the frame of the machine constructed preferably of wooden sills joined in a firm and substantial manner; although steel or other material may be used, and it is not therefore desired to limit the construction to any particular material. In the drawings the two side timbers B', are connected by the transverse superimposed sills B², and the entire frame is braced and strengthened by the timbers B³, which are tenoned and joint bolted at each end to the timbers B². The four caster wheels C, are swivelly connected to the frame B, one of the wheels being secured underneath at or near each of the four corners of the frame. These wheels enable the machine to be moved in any direction with perfect freedom.

D, D', and D², are the cylinders, which may be used separately or in gangs of any suitable number (the drawings show a gang of three) and may be of any desired diameter, or length, and be constructed of any suitable material, although double strength wrought iron tubing is deemed preferable. When tubing is used the interiors of the cylinders are hollow, and the ends will be closed by the metal plugs D³, which may be screwed in, riveted, or otherwise fastened. The plugs D³ are projected a suitable distance beyond the tube and have a sprocket wheel secured to the peripheries of the projected ends, preferably by casting integral therewith.

D⁴, are thin steel knives cut in the shape shown in Fig. 6, from thin plates of steel of proper width. The edge that slopes from heel to point is sharpened. The tap bolt is riveted to the front part of the heel of the blade in the manner and form as shown in Figs. 5 and 6. When a knife is in place on a cylinder for work, the rear part of the heel is firmly set against the cylinder, forming a solid substantial brace to the blade, and prevents the blade from turning with side or back to the front, when the cylinder with its blades is being rapidly revolved, top to the front when at work. These knives are so placed on the cylinder that from four to six of them will be equally spaced around the cylinder in each lineal inch of same. The knives in each succeeding inch are so placed and staggered as to the preceding ones, that those knives which are lineally in line upon the cylinder will be as far apart as possible and the cylinder be balanced so as to rotate smoothly.

G, is a solid circular babbitted journal box, wherein are journaled the ends of the cylinder shafts G'. The box G, is provided with trunnions g, which are mounted in openings made for same in the frame F, Fig. 2 and shown in section in Figs. 3 and 4.

G', is the cylinder shaft that passes longitudinally through the center of the cylinder and projects a proper distance through a central babbitted opening in the plugs D³, and through the box G, and are held from longitudinal displacement by the end pins g². As thus arranged the shaft may revolve in the box G, at the same time the cylinders D, D', and D², revolve around the shafts G', thus securing the greatest freedom of motion possible, for the cylinder with the minimum of friction in any of the bearings.

E, E', E², E³, E⁴, and E⁵, are bent levers.

E, E', E² and E³, are pivotally connected at their front ends to the brackets H, which brackets are bolted to the rear side of the front cross sill B². These levers pass back and down near the ground line at which point the frame F is mounted thereon as seen in Fig. 2 and is firmly bolted thereto as shown in Fig. 3. These levers pass thence back and curve upward and over the rear cross sill B², where they are provided with handle extensions e, and spring actuated dogs, which engage the notches in a locking bar P, which is held in a vertical position between projecting lugs R, secured to the rear side of the rear cross sill B². By this handle e, dogs and locking bar P, the cylinder can be regulated to cut any required depth into the ground within the limits of the length of the knives. The lower ends of the said bar P, are pivotally connected with the rear ends of the link bar Q, the front ends of the said bar Q are pivotally secured to the levers E, E', E², and E³ and said link bars Q Q, are mounted on caster wheels M, the swivel connection therewith being immediately in front of the connection of the bar P. This caster wheel M, carries the rear ends of the levers E, E', E², and E³, and by means of the lateral lugs l, on the levers E⁴, and E⁵, also carries the front ends of levers E⁴, and E⁵, (as more fully described below) upon which are mounted the frames F and the cylinders D, D' and D² and permits these cutting cylinders to rise and fall, conforming to the surface of the ground in the line of travel when at work, while at the same time the trunnioned journal boxes G, allow these cylinders to conform to the surface of the ground laterally. All the while however the relative position of each cylinder to the driving counter shafts I and I' is rigidly maintained, so that the chain belts are not slackened. The levers E' and E², in addition to the above, are also bent laterally, in an outward direction as seen in Fig. 1 at a point back of the frame F, beyond the points of the knives in the cylinders D and D². This outward bend being sufficient to allow the levers E⁴ and E⁵, with their frames F, and the center cylinder D', they carry, to work in between them, when they are each bent to the rear again, and carried back as above described.

Levers E⁴ and E⁵ are pivotally secured at the rear ends by brackets H, which are bolted to the front side of the rear cross sill B². These levers pass thence forward and downward, near the ground line where each is mounted with a frame F, carrying cylinder D', and a short distance in front of frame F, these levers end. At these front ends a lateral lug or finger $l$, is secured to the top of each of the said levers, which lugs extend at right angles outward, and rest respectively on top of levers E' and E². These lugs or fingers $l$, being held in place by the loops S, secured to the levers E' and E², permitting the said lugs to slide forth and back as the levers E' and E² are raised and lowered. Thus graduating cylinder D', with the same mechanism that regulates cylinders D and D², and arranging the cylinders when in gangs so that no unpulverized ground is left between their ends.

H, are brackets firmly bolted to the rear side of the front cross sills B², and the front side of the rear cross sills B². These brackets extend backward and forward respectively and incline downward, so that the center of the counter shafts I and I', which are journaled in the journal boxes $h$, near the outer ends of these brackets H, will be in lateral line with the under side of said cross sills B². The lower half of said journal box $h$, is cast integral with said bracket, also, underneath the outer ends of said brackets H, and cast integral with each, is a pair of lugs $h^2$, between which is pivotally connected the front ends of levers E, E', E² and E³, and the rear ends of E⁴ and E⁵. The center of the pivots are in line between the center of the counter-shafts I and I', and the center of the cylinder shafts G', when the cylinder is so set that its knives will cut four inches into the ground.

I and I', are counter shafts journaled in the boxes $h$, on the brackets H. This shaft I, is in sections, which are joined together by the universal couplings I³, in order to prevent the possibility of cramping, or binding of the shaft I, in the boxes by any springing in the frame from passing over uneven ground when at work.

J, is a pulley keyed to the shaft I, and connected by the belt $j$, with the driving pulley, J², on the engine, through which power is transmitted that revolves the cutting cylinder from four hundred to six hundred revolutions per minute, when the engine is traveling from two and one half to three and one half miles per hour.

K, are sprocket wheels keyed to the shafts I, and I', which by means of the sprocket chains connect with the sprocket wheels K' on cylinder ends D³, and rotate the said cutting cylinders. Sprocket wheel K² on the shaft I, drives sprocket K³ on the shaft I'.

Fig. 7, shows a thin steel plate of proper width, from which the knives D⁴, are cut. The dotted lines show the cuts to be made to obtain the required shapes. The sloping edge from $a$ to $b$, is the sharpened or front edge and by means of this slope when the knives are in position on the cylinder and at work, the sharpened edge has a slightly drawing cut which enables it to easily cut through grass, weeds, stalks or other vegetable débris, and not pick the same up as it would do if left straight. This blade being riveted to the tap bolts D⁵, so that the part from $a$ to $c$, is in line and protruding slightly beyond the flush with said bolt leaves the base or heel of said blade from $c$ to $d$, at an acute angle with said tap, so that when the knife is in position on the cylinder for work the heel point $d$, is in contact with the cylinder bracing said blade, and the force of a blow on the sharpened edge is as to the cylinder perpendicular on the tap-bolt and heel point $d$, instead of lateral; thus greatly strengthening the same.

The collar O, around the front end of the boiler of engine A has attached to it on either side, the rods $o, o$, which severally extend back to and are attached to the frame B, as shown in Fig. 1, for the purpose of holding said frame rigidly in line with the engine at all times and keeping the frame B, from springing as it would be liable to do if the draft was alone from the center of such frame. The engine is attached to the said frame B, in the center by any of the usual modes. The rods $o\,o$ as also the other couplings are so arranged that they can be readily detached from the engine and the engine be then brought around to the right side of the frame B, and coupled to it by the Y N. The cylinders D, D' and D² can then be raised so that the knives will be clear of the ground by the lever extensions $e$, and the locking bars P, and then the caster wheels M, the levers E, E', E² and E³ together with all of the mechanism mounted on same, can be further raised from the ground by winding up the chains $u$, on the shaft T, when the entire machine can be moved on its own wheels C from place to place by the engine. The shaft T, is secured to the sills B', in rear of the rear cross sill B² by staple bolts and supported by bracket hooks secured to the rear side of said cross sills B². On the end of said shaft T is the crank $t$, also said shaft is provided with ratchet wheel and dog for holding it at any point desired. The upper ends of chains $u$, are attached to the said shaft T and the lower ends of said chains are attached to the rear ends of the link bars Q. Winding these chains up on the shaft T raises the caster wheels M and all mounted thereon, clear of the ground when moving from place to place as above specified.

W, are eyes or hooks fastened to the rear side of the rear cross sill $B^2$ at proper places to which can be attached the tongues of seeders, drills or planters when it is desired to plant the crop as the ground is prepared.

A drop curtain Z is arranged behind each of the cylinders to arrest the particles that may be thrown by the rapid movement of the cylinders.

Having thus fully described my invention, what I claim as new, and desire to secure by Letters Patent, is—

1. The combination with the frame B, levers E, E', $E^2$, $E^3$, $E^4$, and $E^5$, pivotally secured to the brackets H, which are firmly bolted to the frame B; means for locking the levers E, E', $E^2$, $E^3$, $E^4$ and $E^5$, at different heights; cylinders D, D' and $D^2$, adjustably secured to the said levers; knives $D^4$, secured to the cylinders; and means for giving the machine a forward movement, and means independent of such forward movement for rotating said cylinders, substantially as described and specified.

2. The combination of the bent levers E, E', $E^2$, $E^3$, $E^4$ and $E^5$, with handles e, locking bars P, caster wheels M, link bars Q, frames F, mounted on said bent levers, circular journal boxes G mounted in frames F by trunnions, shafts G' mounted in said boxes G and secured by end pins g, cylinders D, D' and $D^2$, with knives secured to the surface at right angles therewith, said cylinders revolving around shafts G' at the same time said shafts G', revolve upon their own journals in the boxes G, substantially as described and for the purposes specified.

3. The cylinders D, D' and $D^2$, with knives secured to and projecting from the surface thereof, with plugs $D^3$ and sprocket wheels K', applying the power to the peripheries of said cylinders, and revolving them upon their shafts G', while said shafts G' revolve in their journal boxes G, substantially as described.

4. The combination with the cylinders, of the knives formed with a sloping cutting edge and fastened to the cylinder by tap bolts, or otherwise secured thereto, with the heel of the blade at an acute angle, with said tap bolt and the rear part of heel firmly in contact with the surface of the cylinder when knife is in position for work, substantially as described and specified.

In testimony whereof I affix my signature in presence of two witnesses.

JAMES BUCHANAN.

Witnesses:
JOSEPH A. MINTURN,
W. L. BUSHONG.